United States Patent [19]
Hollis

[11] Patent Number: 5,443,332
[45] Date of Patent: Aug. 22, 1995

[54] ROCKBOLT TENSIONING

[75] Inventor: Ian Hollis, Shirland, United Kingdom

[73] Assignee: Exchem PLC, London, United Kingdom

[21] Appl. No.: 15,471

[22] Filed: Feb. 9, 1993

[51] Int. Cl.6 .............................................. E21D 20/02
[52] U.S. Cl. ................. 405/259.6; 405/259.2; 411/1; 411/5
[58] Field of Search ............... 405/259.5, 259.2, 259.1, 405/259.6; 411/1–5, 9, 10

[56] References Cited

U.S. PATENT DOCUMENTS

| | | | |
|---|---|---|---|
| 3,877,235 | 4/1975 | Hill | 405/259.2 X |
| 4,295,761 | 10/1981 | Hansen | |
| 4,347,020 | 8/1982 | White et al. | 411/5 |
| 4,386,877 | 6/1983 | McDowell | 405/259.6 |
| 4,556,350 | 12/1985 | Bernhardt et al. | 405/259.6 |
| 4,662,795 | 5/1987 | Clark et al. | 405/259.2 X |
| 4,955,758 | 9/1990 | Hyde | 405/259.2 X |
| 5,352,065 | 10/1994 | Arnall et al. | 405/259.2 |

FOREIGN PATENT DOCUMENTS

| | | |
|---|---|---|
| 1269471 | 4/1972 | United Kingdom . |
| 2211259 | 6/1989 | United Kingdom . |
| 2211260 | 6/1989 | United Kingdom . |

Primary Examiner—Dennis L. Taylor
Attorney, Agent, or Firm—Merchant & Gould Smith, Edell, Welter & Schmidt

[57] ABSTRACT

A rockbolt for anchoring in a borehole and then tensioning it has a nut at its distal end whose screw threaded engagement with the rockbolt is utilised to force the nut against the surface at which the borehole is provided and cause tensioning of the rockbolt. Initially, the nut cannot be run down the rockbolt owing to provision of a disc seated in a recess at the distal end of the nut and which is only forced out from the recess when the nut is subject to a minimum predetermined torque. Holding of the disc in the recess is achieved by deformations of the nut resulting in the perimeter of the disc being frictionally restrained.

10 Claims, 2 Drawing Sheets

ROCKBOLT TENSIONING

This invention relates to rockbolts of the kind used for strata reinforcement in mine roofs and the like.

In the installation of such rockbolts, a bonding agent, generally a settable resinous composition contained in one or more frangible cartridges is placed at the closed end of a bore hole drilled into the rock strata and a rock bolt having a threaded end portion, is inserted into the bore hole with its threaded end portion protruding from the end of the bore hole. A washer (or bearing plate) and a nut are positioned on the threaded end portion and the bolt is then rotated so as to be driven into the bore hole and thereby puncture the resinous cartridge and cause the settable resinous composition to be distributed around at least the end of the rockbolt. The rockbolt is then held in a fixed position for a short time to allow the resinous composition to harden and thereby fix the bolt in the bore hole. Thereafter a tension can be applied on the bolt by tightening the nut onto the bearing plate.

With one type of rockbolt system, the bolt is initially spun in using a direct drive onto the bolt. the bolt spinning adaptor used for this purpose must then be changed for a nut tightening adaptor to tension the bolt through rotation of the free-running nut. A particular disadvantage of this system is that two adaptors are required and it is time consuming changing adaptors and locating the nut in the tightening adaptor, especially if high up at a roof surface.

With another known rockbolt system, the bolt is spun in using the nut itself, which is prevented in various ways from running up the thread of the bolt so that the initial rotation of the rockbolt is effected by applying a relatively low torque to the nut, which is modified, for example, by the incorporation of indentations or plastics inserts in the thread of the nut, in order to prevent the nut from running up the threaded end portion of the bolt at the low torque applied. When the rockbolt is fixed in the bore hole, a higher torque is applied to the modified nut which is sufficient to overcome the resistance which prevented the nut from running up the thread during the initial rotation period and is sufficient to tighten the nut onto the bearing plate so as to tension the bolt.

Various other means for preventing the nut from running up the threaded end portion of the bolt when a low torque is applied have been proposed. The nut can, for example be provided with a thread pitch which is sufficiently different from that of the threaded end portion of the bolt to permit rotation of the nut and the rockbolt as a unitary member below a predetermined torque. Alternatively, the nut may be provided with deformations, such as by crimping, so as to increase to a predetermined value the torque required to screw the nut onto the bolt.

A further type of modified nut is the domed nut whose dome prevents the nut running up the thread during mixing. Only when sufficient torque is applied is it possible for the dome to be forced by the bolt and enable the nut to travel freely on the threaded part of the bolt with a variation of this type of rockbolt system, a plastic washer is fitted into the nut. When the bonding agent has set and an increased torque is applied to the nut, the bottom of the bolt pushes out the washer.

Generally with such nuts, generically known as shear nuts, there is a common disadvantage that the desired free-running is not attained as there is invariably some residual resistance to free-running of the nut resulting, for example, from residual amounts of plastics material in the threads of the nut. Consequently the torque applied to the nut is not converted in its entirety into tensioning of the bolt, but some of it is employed in imparting torsion to the bolt. Thus the highest possible tension in the bolt is not achieved for a given torque and also the torsion in the bolt reduces the actual strength of the bolt. This problem is lessened, but not completely eradicated with the shear bolts according to British Patents Nos. 2 211 260 and 2 211 259. In the former, shear means such as a shearing pin is positioned in the threaded end portion of the bolt and engages the nut so as to enable rotation of the nut and rock bolt as a unitary member to be effected in use below a predetermined torque without affecting the position of the nut on the threaded end portion, but which will shear and permit the nut to rotate with respect to the rockbolt so as to tighten against the bearing plate when a torque equal to or greater than the predetermined torque is applied to the nut after the rockbolt has been anchored in a bore hole. With the latter, the shear means is located separately from and unconnected to the nut, being located for example in a bore hole formed perpendicularly to the axis of the rockbolt. With both these systems there remains the problem that parts of the sheared pin may become trapped in the thread of the nut and prevent its free travel along the bolt.

An alternative approach to the use of shear pins is disclosed in British Patent specification No. 1 269 471. The threaded nut has attached to its distal face by a breakable joint a plate which limits the travel of the nut until a sufficiently high torque is applied to cause the plate to become separated from the nut. The plate is either to be integral with the nut or to be attached to it by welding or cement. In the former case, integral combination of plate and nut requires relatively expensive manufacturing techniques and leave a product which requires a particularly high torque before separation of plate and nut takes place. In the latter case, manufacturing costs are also high and there exists the problem of cement or adhesive entering the threads of the nut to restrict free rotation of the nut.

Finally, U.S. Pat. No. 4,295,761 describes a rockbolt system of the aforementioned general type in which the nut has a first smaller diameter bore portion extending therethrough and which is adapted to mate with the threads of the distal end of the bolt and a second enlarged diameter bore portion in which a disc is seated and which is retained by means of inwardly crimped lip formation integral with the nut. The disc bars penetration of the bolt through the nut until a predetermined torque force level is exceeded. The crimped lip formations then release the disc and accommodate further threaded insertion of the bolt through the bore of the nut when the bolt being restrained at such time against rotation by setting of resin in which the proximal end of the bolt is anchored. Because of variations in the shape of the bolt end which take place, considerable difficulty is achieved in establishing reproducible breaking torques for bolts. Moreover, the manner in which crimping is effected makes no concession to irregularities in the end face of the bolt. In general, in fact, the crimping needs to be carried out to such an extent to hold the disc firmly that the rockbolt will not be able to respond to application of a relatively low torque to release the disc.

It is an object of the present invention to provide an improvement in such type of rockbolt assembly.

According to the present invention, there is provided a rockbolt assembly comprising an elongate rockbolt having a threaded first end portion and an opposite second end portion adapted to be anchored in a bore hole formed at a surface, a nut capable of threadedly engaging the threaded first end portion of the rockbolt so as to enable rotation of the nut and rockbolt as a unitary member substantially to be effected, in use, below a predetermined torque without affecting the position of the nut on the threaded end portion, and a disc seated in a recess within the proximal end of the nut which represents an extension of an internally threaded passage through the nut, the disc being held within the recess by means of a plurality of deformations of the nut to cause local areas of the nut to extend radially inwardly to abut the perimeter of the disc and exert a frictional restraining force on the disc, but which disc is separable from the nut against the retaining effect of the deformations when a torque equal to or greater than said predetermined torque is supplied to the nut after the rockbolt has been anchored in a said bore hole thereby to enable the nut to be rotated on said threaded end portion and be forced against said surface to cause tensioning of the rockbolt, the disc width and the recess internal diameter at the deformations being greater than the major thread diameter of the passage.

The disc placed in the distal end of the nut will generally be circular and sit in a circular recess. However, it can equally well be square or polygonal provided that the recess is appropriately shaped. The disc can be either a solid disc or an annular disc, usually with a circular hole, and when circular can simply be a circular element such as is frequently stamped out from blanks. Typically, the disc will be formed of metal, but other rigid materials such as a preformed composite element can be used. The width or diameter of the disc is greater than the major thread diameter of the passage through the nut. Likewise, the internal diameter at the deformations, i.e. the width of the space defined between them is greater, preferably considerably greater, than the major thread diameter of the nut. When there is a hole in the disc i.e. it is of conventional washer form, the width or diameter of the hole in the disc will be less than the minor diameter of the thread.

When the nut is fitted to the bolt, the bolt end will rest against the circular disc and will be effectively fixed. During the spinning in operation, the circular disc will allow the nut to rotate the bolt through the bonding agent. When the bonding agent has set, the torque applied to the nut will increase to a level at which the disc will be pushed out of the nut. The nut will then be completely free to run up the bolt. The breakout torque is determined by one or more of the strength of material used for the disc, the size, shape and number of deformations that are used to provide the contact area between nut and disc and by the edge profile of the disc. Break-out occurs at the torque that provides sufficient load or thrust to force the disc free from the deformations. In this connection, the edge profile of the disc is of interest insofar as tapering of the disc at its perimeter may occur during stamping. A different action is obtained depending on which way around a disc is when it is introduced into the recess.

The system of the invention can be used with any existing tightening device for a nut. Special adaptors are not required. Although primarily developed for underground roof bolting, the inventive concept may also be applied to any system where free running of a nut over a bolt is to be carried out once a predetermined torque is applied. Generally, the rockbolt assembly will additionally comprise a bearing plate having an aperture of a size sufficient to allow it to be positioned on the threaded first end portion of the rockbolt so as to be capable of being forced against a surface by rotation of the nut on the threaded end portion to cause tensioning of the rockbolt when anchored in a bore hole.

For a better understanding of the invention and to show how the same may be carried into effect, reference will now be made, by way of example only to the accompanying drawings wherein, FIGS. 1a to 1c show the steps involved in installing a rockbolt;

FIG. 4b shows an exploded view of a shearing nut of FIG. 4a, and

FIG. 4c is a plan view from above of the shearing nut of FIG. 4a.

Figure 1A:
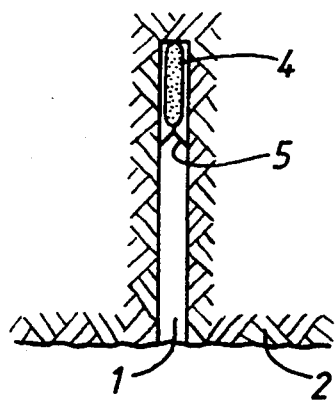
Figure 1B:
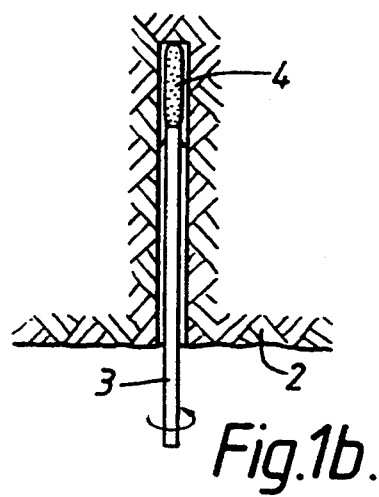
Figure 1C:
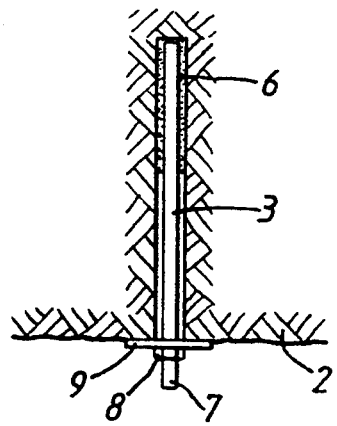

FIGS. 1a to 1c show a vertical bore hole 1 in rock strata 2 which are to be stabilized by means of a rockbolt 3. Initially, a frangible capsule 4 containing settable resin material is inserted in the bore hole 1. The capsule carries a flange member 5 to hold it in place in the bore hole immediately after its emplacement. The rockbolt 3 is then introduced into the bore hole to press against the capsule 4 and causes rupture thereof. This forward motion of the rockbolt is accompanied by rotation thereof, resulting in the settable resinous composition in the capsule being able to be distributed around at least the end of the rockbolt and set.

Figure 2A:
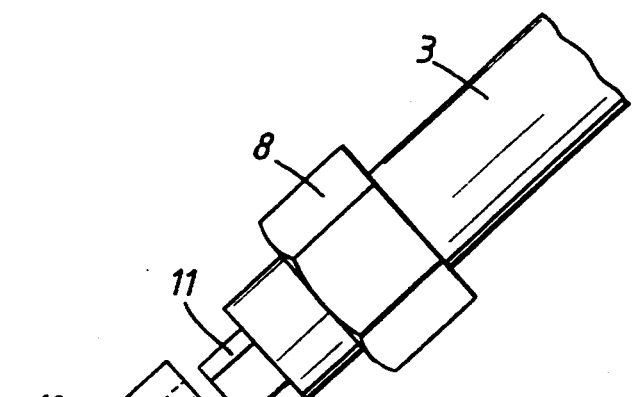
FIGS. 2a and 2b show the bolt spinning adaptor and nut tightening adaptor which have to be employed with non-shearing arrangments.
Figure 2B:
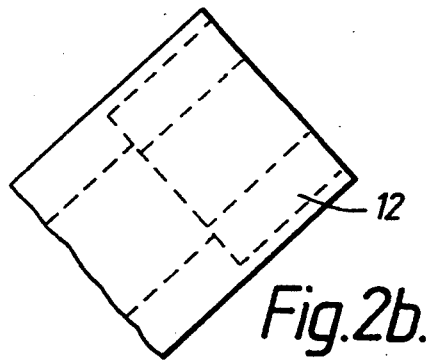

FIG. 1c shows a body of resin material 6 positioned around the end of the rockbolt 3. This has set. The proximal end 7 of the rockbolt is now shown provided with a nut 8, shown here to be hexagonal, but optionally of square or other form, which has been rotated around the threaded end of the rockbolt to tension the bolt and at the same time hold a bearing plate 9 over the mouth of the bore hole 1. The nut and plate can be emplaced over the end of the rockbolt prior to introduction of the rockbolt or applied subsequently. FIG. 2a shows how in the latter case (bearing plate not shown), a bolt spinning adaptor 10, having a square section recess is fitted over a square headed end portion 11 of the rockbolt for the purpose of spinning in the rockbolt. Once the rockbolt is incapable of further rotation as a result of setting of the resin 6, it is necessary to remove the bolt spinning adaptor 10 and fit a nut tightening adaptor 12, shown in FIG. 2b over the end of the rockbolt so that its recess fits over the nut 8. This is a time consuming operation in a difficult environment such as a mine tunnel. A large number of rockbolts generally have to be emplaced when reinforcing a mine tunnel roof.

Figure 3A:
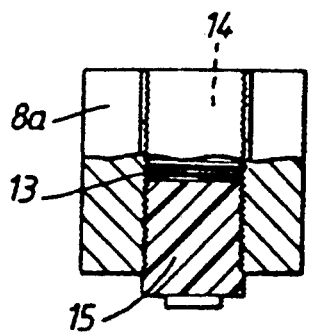
FIGS. 3a to 3c show different forms of prior art shearing nut.
Figure 3B:
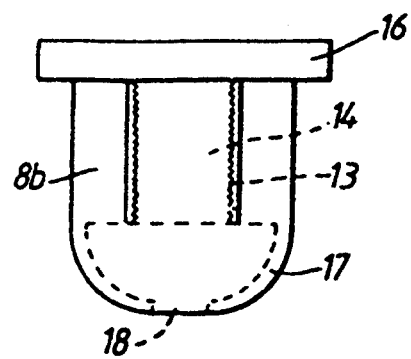
Figure 3C:
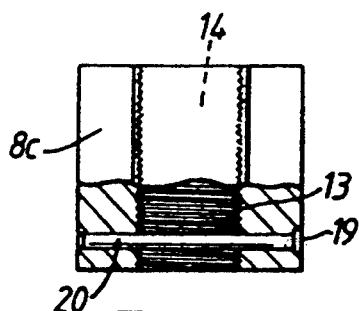

FIGS. 3a to 3c show alternatives to the simple hexagonal nut shown in FIG. 2a which will enable rotational operations carried out on the rockbolt to be carried out with a single adaptor. The modified nuts may be generically termed shearing nuts, owing to the fact that at low torque they have a function no different to that of the square end section 11 of the rockbolt 3 shown in FIG.

2a. However, when the predetermined torque is exceeded, their functioning becomes enhanced in that they are freed so that they can be rotated along the screw threading on the distal end of the rockbolt.

Thus, in FIG. 3a, a nut 8a engages with screw threading 13 on the proximal end of a rockbolt. The through passage 14 of the nut is partially occupied by a plastics or resin plug 15 which is forced out of the passage 14 when the nut 8a is subject to torque in excess of a predetermined value and then the nut is freed for travel down the distal end of the rockbolt. The variant shown in FIG. 3b is a nut 8b having a flanged end 16 and which is provided at its opposite end with a domed portion 17, having an opening 18 therein. Initially the nut enters into screw-threaded engagement with the distal end of the rockbolt 3 which can pass through the passage 14 in the nut 8b to make contact with the domed portion 17. The application of low torque to the nut will result merely in rotation of the rockbolt itself. However, when a predetermined value is exceeded, then the rockbolt will be forced through the opening 18 in the end of the nut. The nut 8b will be able to travel along the rockbolt until the flange 16 abuts the rock surface to be held thereagainst.

Finally, FIG. 3c shows a nut 8c formed with castellated indentations 19 opposed pairs of which accommodate the protruding ends of shear pins 20, located in a cylindrical bore drilled through the bolt (not shown). The shear pin 20 is made of metal or thermoplastic plastics such as nylon and is designed to shear under an applied torque of, say, 2.5 Nm. Application of a relatively low torque to the nut will enable the nut to remain fixed in place on the end of the rockbolt. Application of a higher torque, say, 4.2 Nm, will cause the shear pin to shear off and thereby allow the nut 8c to rotate with respect to the bolt and thereby force an adjacent bearing plate against the rock face. Because the nut 8c is then substantially free running, substantially all the torque applied to the nut is converted into tensioning for the bolt so that the highest possible tension in the bolt for a given torque can be achieved and there is substantially no torsion in the bolt which would reduce the axial loading of the bolt.

With the nuts of FIGS. 3a and 3c, there is the risk that residual material from the plug 15 and pin 20 respectively will restrict free movement of the nut on a rockbolt. With the nut of FIG. 8b, the dome may not be opened out sufficiently far to prevent the peripheral part of the opening 18 from catching in the screw thread of the rockbolt and preventing free travel of the nut.

Figure 4A:
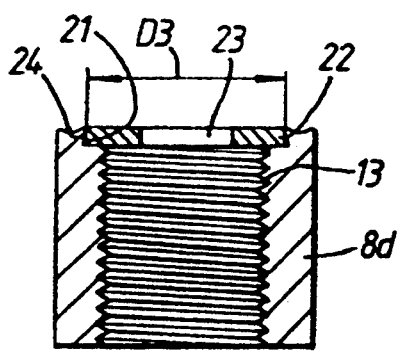
FIG. 4a shows in longitudinal section a shearing nut of a fixing assembly according to the invention.
Figure 4B:
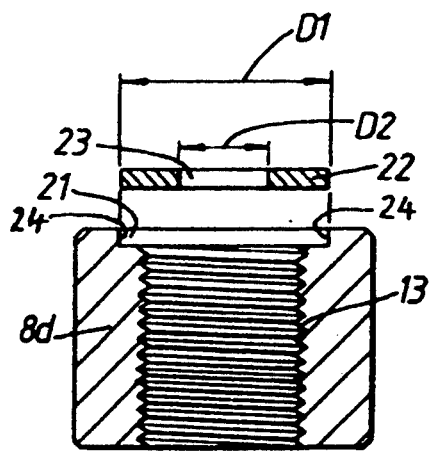
Figure 4C:
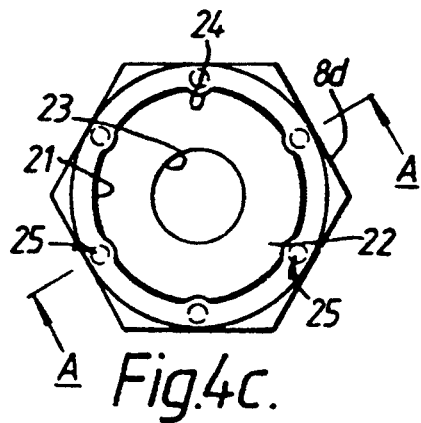

FIG. 4a shows a nut 8d embodying the invention. The nut 8d has screw threading 13 and is formed with a recess 21 at one end. Seated in the recess is a circular metal disc 22 having a central opening 23 therein. The disc 22 is held in position by means of a plurality of deformations 24 formed by application of downwardly acting force at locations 25 of the nut around the recess 21 to deform the nut plastically to produce depressions in its proximal end surface and reduction in the internal diameter of the recess at the position of such deformation and at the same time cause the recess margin to be displaced inwardly locally to an extent sufficient to grip the margin of the disc which has been placed in the recess previously. Typically, there will be six such deformations with a hexagonal nut as shown in FIG. 4c. FIG. 4b shows the form of the nut before introduction of the circular disc 22 into the recess 21. FIG. 4c is a section through FIG. 4c at A—A.

As can be seen particularly from FIGS. 4a and 4b, the diameter D1 of the recess 21 is much greater than the major diameter of the thread within the nut 8d. Moreover, the diameter D3 at the deformations is greater than the major thread diameter. When there is a central hole 23 as shown, then its diameter D2 is less than the minor diameter of the screw threads. The number of deformations and the size thereof determines the locating force holding the circular disc 22 in position, i.e. the torque required to release the disc from the recess. The manufacture of such a nut 8d is achieved very simply by placing the circular disc 22 within the recess 21 and deforming the nut at the appropriate number of locations 24. When the nut is subject to a predetermined value of torque, the circular disc will simply pop out and the location of any residue from the deformations will be such as not to cause interference with the free running of the nut on the end of a rockbolt. In general there will be no such residue.

I claim:

1. In a rockbolt assembly comprising an elongate rockbolt having a threaded first end portion and an opposite second end portion adapted to be anchored in a bore hole formed at a surface, a nut capable of threadedly engaging the threaded first end portion of the rockbolt so as to enable rotation of the nut and rockbolt as a unitary member substantially to be effected, in use, below a predetermined torque without affecting the position of the nut on the threaded end portion, and to allow rotation of the nut on said threaded end portion for the nut to be forced against said surface to cause tensioning of the rockbolt to take place when a torque equal to or greater than said predetermined torque is supplied to the nut after the rockbolt has been anchored in a said borehole, the improvement comprising provision of a recess within the proximal end of the nut which represents an extension of an internally threaded passage through the nut and of a disc seated in said recess and held therein by means of a plurality of deformations on the nut producing depressions in a proximal end surface and reduction in internal diameter of the recess in a position of such deformations to cause local areas of the nut to extend radially inwardly to abut the perimeter of the disc and exert a frictional restraining force on only the perimeter of the disc which is maintained until the nut is subject to a torque equal to or greater than said predetermined torque when the disc becomes separable from the nut, the disc width and the recess internal diameter at the deformations being greater than the major thread diameter of the passage.

2. A rockbolt assembly according to claim 1, wherein said disc is circular and the recess in which it is seated is circular.

3. An assembly as claimed in claim 2, wherein the disc is a circular solid element.

4. An assembly as claimed in claim 2, wherein the disc is an annular element having a circular hole therein.

5. An assembly as claimed in claim 2, wherein the disc is an annular element having a circular hole therein, the width of the hole in the disc being less than the minor diameter of the thread of said internally threaded passage.

6. In a rockbolt assembly comprising an elongate rockbolt having a threaded first end portion and an opposite second end portion adapted to be anchored in a bore hole formed at a surface, a nut capable of threadedly engaging the threaded first end portion of the rockbolt so as to enable rotation of the nut and rockbolt as a unitary member substantially to be effected, in use, below a predetermined torque without affecting the position of the nut on the threaded end portion, and to allow rotation of the nut on said threaded end portion when a torque equal to or greater than said predetermined torque is supplied to the nut after the rockbolt has been anchored in a said borehole, and a bearing plate having an aperture of a size sufficient to allow it to be positioned on the threaded first end portion of the rockbolt so as to be capable of being forced against said surface by said rotation of the nut on the threaded end portion, to cause tensioning of the rockbolt to take place, the improvement comprising provision of a recess within the proximal end of the nut which represents an extension of an internally threaded passage through the nut and of a disc seated in said recess and held therein by means of a plurality of deformations on the nut producing depressions in a proximal end surface and reduction in internal diameter of the recess in a position of such deformations to cause local areas of the nut to extend radially inwardly to abut only the perimeter of the disc and exert a frictional restraining force on the disc which is maintained until the nut is subject to a torque equal to or greater than said predetermined torque when the disc becomes separable from the nut, the disc width and the recess internal diameter at the deformations being greater than the major thread diameter of the passage.

7. A rockbolt assembly according to claim 6, wherein said disc is circular and the recess in which it is seated is circular.

8. An assembly as claimed in claim 7, wherein the disc is a circular solid element.

9. An assembly as claimed in claim 7, wherein the disc is an annular element having a circular hole therein.

10. An assembly as claimed in claim 7, wherein the disc is an annular element having a circular hole therein, the width of the hole in the disc being less than the minor diameter of the thread of said internally threaded passage.

* * * * *

UNITED STATES PATENT AND TRADEMARK OFFICE
CERTIFICATE OF CORRECTION

PATENT NO. : 5,443,332

DATED : August 22, 1995

INVENTOR(S) : Iam Hollis

It is certified that error appears in the above-identified patent and that said Letters Patent is hereby corrected as shown below:

In column 1, line 8, "One" should be --one--.

In column 2, lines 32 and 49, "distal" should be --proximal--.

In column 3, line 29, "distal" should be --proximal--.

In column 5, lines 4, 11 and 15, "distal" should be --proximal--.

Signed and Sealed this

Twenty-third Day of January, 1996

Attest:

BRUCE LEHMAN

Attesting Officer     Commissioner of Patents and Trademarks